(12) United States Patent
Gleichauf et al.

(10) Patent No.: US 6,282,546 B1
(45) Date of Patent: Aug. 28, 2001

(54) SYSTEM AND METHOD FOR REAL-TIME INSERTION OF DATA INTO A MULTI-DIMENSIONAL DATABASE FOR NETWORK INTRUSION DETECTION AND VULNERABILITY ASSESSMENT

(75) Inventors: Robert Gleichauf; Steven Shanklin, both of San Antonio, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/107,790

(22) Filed: Jun. 30, 1998

(51) Int. Cl.[7] .................................................. G06F 17/30
(52) U.S. Cl. .............................. 707/102; 707/6; 713/201
(58) Field of Search ............................. 707/4, 6, 10, 102, 707/104; 345/355–357; 709/318; 713/200–202

(56) References Cited

U.S. PATENT DOCUMENTS

| | | | |
|---|---|---|---|
| 4,868,866 | * | 9/1989 | Williams, Jr. .................... 340/825.31 |
| 4,937,743 | * | 6/1990 | Rassman .................................. 705/8 |
| 5,032,979 | | 7/1991 | Hecht et al. .......................... 364/200 |
| 5,101,402 | | 3/1992 | Chiu et al. .............................. 370/17 |
| 5,278,901 | | 1/1994 | Shieh et al. .............................. 380/4 |
| 5,319,777 | | 6/1994 | Perez .................................... 395/600 |
| 5,404,488 | * | 4/1995 | Kerrigan et al. ...................... 711/133 |
| 5,414,833 | | 5/1995 | Hershey et al. ...................... 395/575 |
| 5,448,724 | | 9/1995 | Hayashi ........................... 395/182.02 |
| 5,488,715 | | 1/1996 | Wainwright ..................... 395/182.02 |
| 5,524,238 | | 6/1996 | Miller et al. ......................... 395/600 |
| 5,557,742 | | 9/1996 | Smaha et al. ........................ 395/186 |
| 5,592,666 | | 1/1997 | Perez et al. .......................... 395/600 |
| 5,606,668 | | 2/1997 | Shwed ............................. 395/200.11 |
| 5,621,889 | | 4/1997 | Lermuzeaux et al. ............... 395/186 |
| 5,647,058 | | 7/1997 | Agrawal et al. ..................... 395/601 |
| 5,649,190 | * | 7/1997 | Sharif-Askary et al. ................ 707/1 |
| 5,699,513 | | 12/1997 | Feigen et al. .................... 395/187.01 |

(List continued on next page.)

OTHER PUBLICATIONS

"Introduction to Algorithms," by Thomas H. Cormen, Charles E. Leiserson, Ronald L. Rivest, Chap. 34, pp. 853–885, Copyright © 1990.

"Preliminary Report on Advanced Security Audit Trail Analysis on UNIX," N. Habra et al., pp. 1–34 (found at http://www.cs.purdue.edu/coast/archive/data/categ24.html), Sep. 1994.

"IDIOT–Users Guide," M. Crosbie, et al., pp. 1–63, (found at http://www.cs.purdue.edu/coast/archive/data/categ24.html), Sep. 1996.

(List continued on next page.)

*Primary Examiner*—Maria N. Von Buhr
(74) *Attorney, Agent, or Firm*—Baker Botts L.L.P.

(57) ABSTRACT

A system and method are disclosed for real-time insertion of data into a multi-dimensional database. The system includes a multi-dimensional database and a user interface operable to access and provide views into the multi-dimensional database. A data insertion engine is coupled to and operable to access the multi-dimensional database. The data insertion engine is further operable to receive and process a real-time data feed and to insert data into the multi-dimensional database responsive to processing of the real-time data feed. In one embodiment, the real-time data feed can represent exploited network vulnerabilities, and the system can be used for network intrusion detection and vulnerability assessment. The method includes receiving a real-time data feed representing detection of an event and processing the event against the multi-dimensional database. Cells associated with the event are identified in the multi-dimensional database and appropriate vectors to the identified cells are created. Data representing the event is then inserted at the identified cells. Visibility to the inserted data is provided through a user interface to the multi-dimensional database. In one embodiment, the event can be an exploited network vulnerability, and the method can be used for intrusion detection and vulnerability assessment.

25 Claims, 7 Drawing Sheets

U.S. PATENT DOCUMENTS

| | | | |
|---|---|---|---|
| 5,721,910 | | 2/1998 | Unger et al. ............................ 395/611 |
| 5,767,854 | * | 6/1998 | Anwar .................................... 345/355 |
| 5,768,133 | * | 6/1998 | Chen et al. .............................. 700/95 |
| 5,774,878 | * | 6/1998 | Marshall ................................. 705/35 |
| 5,793,763 | | 8/1998 | Mayes et al. ......................... 370/389 |
| 5,796,942 | | 8/1998 | Esbensen ......................... 395/187.01 |
| 5,798,706 | | 8/1998 | Kraemer et al. ................. 340/825.07 |
| 5,805,801 | | 9/1998 | Holloway et al. .............. 395/187.01 |
| 5,826,014 | | 10/1998 | Coley et al. ..................... 395/187.01 |
| 5,854,897 | * | 12/1998 | Radziewicz et al. ................. 709/224 |
| 5,919,257 | | 7/1999 | Trostle .................................. 713/200 |
| 5,931,946 | | 8/1999 | Terada et al. ......................... 713/201 |
| 5,978,788 | * | 11/1999 | Castelli et al. ............................ 707/2 |
| 5,991,881 | | 11/1999 | Conklin et al. ...................... 713/201 |
| 5,999,944 | * | 12/1999 | Lipkin .................................. 707/104 |
| 6,003,036 | * | 12/1999 | Martin .................................. 707/102 |
| 6,032,158 | * | 2/2000 | Mukhopadhyay et al. .......... 707/201 |

OTHER PUBLICATIONS

"An Introduction to Intrusion Detection," A. Sundaram, pp. 1–10, (found at http://www.cs.purdue.edu/coast/archive/data/categ24.html), no date.

"Use of a Taxonomy of Security Faults," T. Aslam, et al., pp. 1–10, (found at http://www.cs.purdue.edu/coast/archive/data/categ24.html, Sep. 1996.

"Artificial intelligence and intrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A. Mounji, (found at http://www.cs.purdue.edu/coast/archive/data/categ24.html), no date.

"GrIDS—A Graph Based Intrusion Detection System For Large Networks," S. Staniford–Chen, et al., 10 pages, (found at http://www.cs.purdue.edu/coast/archive/data/categ24.html), no date.

"A Pattern Matching Model For Misuse Intrusion Detection," S. Kumar, et al., pp. 1–11, (found at http://www.cs.purdue.edu/coast/archive/data/categ24.html), no date.

"An application of Pattern Matching in Intrusion Detection", S. Kumar, et al., pp. 1–55, (found at http://www.cs.purdue.edu/coast/archive/data/categ24.html), Jun. 1994.

"A Software Architecture to Support Misuse Intrusion Detection", S. Kumar, et al., pp. 1–17, (found at http://www.cs.purdue.edu/coast/archive/data/categ24.html), Mar. 1995.

"Applying Genetic Programming to Intrusion Detection", M. Crosbie, et al., pp. 1–8, (found at http://www.cs.purdue.edu/coast/archive/data/categ24.html), no date.

"Defending a Computer System Using Autonomous Agents", M. Crosbie, et al., pp. 1–11, (found at http://www.cs.purdue.edu/coast/archive/data/categ24.html), Mar. 1994.

"Analysis Of An Algorithm For Distributed Recognition And Accountability", C. Ko, et al., pp. 1–11, (found at http://www.cs.purdue.edu/coast/archive/data/categ24.html), no date.

"A Standard Audit Trail Format", Matt Bishop, 10 pages, (found at http://www.cs.purdue.edu/coast/archive/data/categ24.html), no date.

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.html), Feb. 1985.

"The Architecture and Implementation of Network–Layer Security Under Unix", J. Ioannidis, et al., 11 pages, (found at http://www.cs.purdue.edu/coast/archive/data/categ30.html), no date.

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/dateg30.html), Sep. 1992.

"Paving The Road to Network Security Or The Value Of Small Cobblestones", H. Orman, et al., pp. 1–17, (found at http://www.cs.purdue/edu/coast/archive/data/categ30.html), May 1994.

"Packets Found on an Internet", S. Bellovin, pp. 1–16, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue/edu/coast/archive/data/categ30.html), Oct. 1990.

"NFS Tracing By Passive Network Monitoring", Matt Blaze, 11 pages (found at http://www.cs.purdue.edu/coast/archive/data/categ30.html).

"Pseudo–Network Drivers and Virtual Networks", S.M. Bellovin, 15 pages, (found at http://www.cs.purdue.edu/coast/archive/data/categ30.html), no date.

Masters Thesis entitled "Addressing Weaknesses in The Domain Name System Protocol", Purdue University, Christoph Schuba, pp. 1–87, (found at http://www.cs.purdue.edu/coast/archive/data/categ30.html), Aug. 1993).

"Countering Abuse of Name–Based Authentication", C.L. Schuba, et al., pp. 1–21, (found at http://www.cs.purdue.edu/coast/archive/data/categ30.html), no date.

"The 'Session Tty' Manager", S.M. Bellovin, pp. 1–16., (found at http://www.cs.purdue.edu/coast/archive/data/categ30.html), no date.

"Secure RPC Authentication (SRA) for TELNET and FTP", D.R. Safford, et al., pp. 1–5, (found at http://www.cs.purdue.edu/coast/archive/data/categ30.html), 1993.

"A Reliable and Secure UNIX Connection Service", D. Draheim, et al., pp. 1–12, (found at http://www.cs.purdue.edu/coast/archive/data/categ30.html), no date.

"TCP Wrapper Network Monitoring, Access Control, and Booby Traps", Wietse Venema, 8 pages., (found at http://www.cs.purdue.edu/coast/archive/data/categ30.html), no date.

"Characteristics of Wide–Area TCP/IP Conversations", R. Cáceres, et al., pp. 1–12, (found at http://www.cs.purdue.edu/coast/archive/data/categ30.html), no date.

"A Unix Network Protocol Security Study: Network Information Service", D.K. Hess, et al., 5 pages, (found at http://www.cs.purdue.edu/coast/archive/data/categ30.html), no date.

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., Proc. of the 14th National Computer Security Conference, Oct. 1991, pp. 363–371., (found at http://seclab.cs.ucdavis.edu/papers.html.), 1991.

"Internetwork Security Monitor: An Intrusion–Detection System for Large–Scale Networks", L.T. Heberlein et al., Proc. of the 15th National Computer Security Conference, Oct. 1992, pp. 262–271, 1992.

"Comparison Between Internet Security Scanner (ISS) 1 x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection System, S. Cheung et al., U.C. Davis Computer Science Department Technical Report SCE–99–2, 1999, pp. 1–47, (found at http://seclab.cs.ucdavis.edu/papers.html.), Jan. 26, 1999.

"Luby–Rackoff Backwards: Increasing Security by Making Block Ciphers Non–Invertible", M. Bellare, et al., Advances in Cryptology–Eurocrypt 98 Proceedings, Lecture Notes in Computer Science, vol. 1403 Springer–Verlat (1998) pp. 1–27, (found at http://seclab.cs.ucdavis.edu/papers.html.), Oct. 17, 1998.

"Detecting Disruptive Routers: A Distributed Network Monitoring Approach", K.A. Bradley et al., Proceedings of the 1998 IEEE Symposium on Security and Privacy, Oakland, CA, pp. 115–124 (found at http://seclab.cs.ucdavis.edu/papers.html.), May 1998.

"Stack and Queue Integrity on Hostile Platforms", P.T. Devanbu, et al., IEEE Symposium on Security and Privacy, Oakland, CA, (found at http://seclab.ucdavis.edu/papers.html.), 1998.

"Techniques for Trusted Software Engineering", P.T. Devanbu et al., Proceedings of the 20th International Conference on Software Engineering, Kyoto, Japan, (found at http://seclab.cs.ucdavis.edu/papers.html.), 1998.

"Data Level Inference Detection in Database Systems," R.W. Yip et al., Proceedings of the 11th IEEE Computer Security Foundations Workshop, Rockport, Massachusetts, (found at http://seclab.cs.ucdavis.edu/papers.html.), 1998.

"The Design and Implementation of a Data Level Database Inference Detection System",. Yip et al., Proceedings of the Twelfth Annual IFIP WG 11.3 Working Conference on Database Security, Chalkidiki, Greece, 14 pages, (found at http://seclab.cs.ucdavis.edu/papers.html.), 1998.

"Theft of Information in the Take–Grant Protection Model", Matt Bishop, 35 pages, Journal of Computer Security 4(4)(1996), (found at http://seclab.cs.ucdavis.edu/papers.html.), Mar. 13, 1997.

"Information Survivability, Security, and Fault Tolerance", Matt Bishop, position of paper for the Information Survivability Workshop, Journal of Computer Security #6) 1 page, (found at http://seclab.cs.ucdavis.edu/papers.html.), 1997.

"Teaching Computer Security", Matt Bishop, position paper for the Workshop on Education in Computer Security, Monterey, CA, 3 pages, (found at http://seclab.cs.ucdavis.edu/papers.html.), 1997.

"Protecting Routing Infrastructures from Denial of Service Using Cooperative Intrusion Detection", S. Cheung et al., Proc. new Security Paradigms Workshop, Cumbira, UK 13 page, (found at http://seclab.cs.ucdavis.edu/papers.html.), 1997.

"An Efficient Message Authentication Scheme for Link State Routing", S. Cheung, Proc. 13th annual Computer Security Applications Conference, San Diego, CA, 9 pages, (found at http://seclab.cs.ucdavis.edu/papers.html.), 1997.

"Cryptographic Verification of Test Coverable Claims", P. Devanbu et al., Proceedings, Fifth ACM/SIGSOFT Conference on Foundations of Software Engineering Zurich, Switzerland) (found at http://seclab.cs.ucdavis.edu/papers.html.), 1997.

"Property–Based Testing; A New Approach to Testing for Assurance", Fink et al., ACM SIGSOFT Software Engineering Notes, 22(4), (found at http://seclab.cs.ucdavis.edu/papers/html.), 1997.

"Checking for Race Conditions in File Accesses", Bishop et al., Computing Systems 9(2)., (found at http://seclab.cs.ucdavis.edu/papers.html.), 1996.

"An Isolated Network for Research", Bishop et al., The 19th NISSC, pp. 1–9, (found at http://seclab.cs.ucdavis.edu/papers.html.), 1996.

"Goal–Oriented Auditing and Logging", Bishop et al., submitted to IEEE Transactions on Computing Systems, (found at http://seclab.cs.ucdavis,edu/papers.html.), 1996.

"Extending The Take–Grant Protection System", J. Frank et al., The IEEE Oakland Conference on Research in Security and Privacy., (found at http://seclab.cs.ucdavis.edu/papers.html.), Dec. 5, 1996.

Network Security Via Reverse Engineering of TCP Code: Vulnerability Analysis and Proposed Solutions, Guha et al., Proc. of the IEEE Infocom '96, CA (found at http://seclab.cs.ucdavis.edu/papers.html.), 1996.

"Attack Class: Address Spoofing", Heberlein et al., The 19th National Information Systems Security Conference, (found at http://seclab.cs.ucdavis.edu/papers.html), 1996.

PhD. Theses entitled Execution Monitoring Of Security–Critical Programs In A Distributed System: A Specification–Based Approach, Calvin Cheuk Wang Ko, 111 pages, (found at http://seclab.cs.ucdavis.edu/papers.html), 1996.

"A Methodology for Testing Intrusion Detection Systems", Puketza et al., *IEEE Transactions on Software Engineering,* vol. 22, No. 10, (found at http://seclab.cs.ucdavis.edu/papers.html), 1996.

"The Exact Security of Digital Signatures—How to Sign with RSA and Rabin", Bellare et al., Earlier version appears in Advances in Cryptology—Eurocrypt '96, LNCS vol. 1070, U. Maurer ed., Springer–Verlag, pp. 399–416), (found at http://seclab.cs.ucdavis.edu/papers/html), 1996.

"How to Protect DES Against Exhaustive Key Search", Kilian et al., Advances in Cryptology—CRYPTO '96., (found at http://seclab.cs.ucdavis.edu/papers.html), 1996.

"GrIDS—A Graph Based Intrusion Detection System For Large Networks", Staniford–Chen et al., The 19th NISSC. 10 pages, (found at http://seclab.cs.ucdavis.edu/papers.html), 1996.

"NetKuang—A Multi–Host Configuration Vulnerability Checker", Zerkle et al., Proc. of the 6th USENIX Security Symposium, San Jose, CA., (found at http://seclab.cs.ucdavis.edu/papers.html), 1996.

"A Standard Audit Trail Format", Matt Bishop, Proc. of the 1995 NISSC, Baltimore, MD., (found at http://seclab.cs.ucdavis.edu/papers.html), 1995.

Abstract entitled Theft of Information in the Take–Grant Protection Model, Matt Bishop, *Journal of Computer Security,* vol. 3, No. 4, (found at http://seclab.cs.ucdavis.edu/papers.html), 1995.

"Improving System Security via Proactive Password Checking", Matt Bishop, *Computers 1& Security,* vol. 14, No. 3, pp.233–249, (found at http://seclab.cs.ucdavis.edu/papers.html), 1995.

"Simulating Concurrent Intrusions for Testing Intrusion Detection Systems: Parallelizing Intrustions", Chung et al., Proc. of the 1995 NISSC, Baltimore, MD, 11 pages, (found at http://seclab.cs.ucdavis.edu/papers.html), 1995.

"Network Security Monitor", L. Todd Heberlein, Lawrence Livermore National Laboratory project deliverable, (found at http://seclab.cs.ucdavis.edu/papers.html), 1995.

"Audit Log Analysis Using the Visual Audit Brewser Toolkit", Hoagland et al., U.C. Davis Computer Science Department Technical Report CSE–95–11, (found at http://seclab.cs.ucdavis.edu/papers.html), 1995.

"MCF: A Malicious Code Filter", R.W. Lo et al., *Computers & Security,* (1995) vol. 14, No. 6, (27 pages.), found at http://seclab.cs.ucdavis.edu/papers.html), 1995.

"Bucket Hashing and its Application to Fast Message Authentication", Phillip Rogaway, Acvances in Cryptology—CRYPTO '95, (found at http://seclab.cs.ucdavis.edu/papers.html), 1995.

"Provably Secure Session Key Distribution—The Three Party Case", Bellare et al., Proc., of the 27th Annual ACM Symposium on Theory of Computing, Las Vegas, NV, (found at http://seclab.cs.ucdavis.edu/papers.html), 1995.

"XOR MACS: New Methods for Message Authentication Using Finite Pseudorandom Functions", Bellare et al.,Advances in Cryptology—CRYPTO '95, (found at http://seclab.cs.ucdavis.edu/papers.html), Oct. 1995.

"Holding Intruders Accountable on the Internet", Staniford–Chen et al., Proc. of the 1995 IEEE Symposium on Security and Privacy, Oakland, CA, (11 pages) found at http://seclab.cs.ucdavis.edu/papers.html), 1995.

"LAFS: A Logging and Auditing File System", Christopher Wee, Proc. of the 11th Computer Security Applications Conference, 10 pages, (found at http://seclab.cs.ucdavis.edu/papers.html), 1995.

"Towards a Property–based Testing Environment with Applications to Security–Critical Software", Fink et al., Proc. of the 4th irvine Software Symposium. 10 pages, (found at http://seclab.cs.ucdavis.edu/papers.html), 1994.

"Property–based Testing of Privileged Programs", Fink et al., Proc. of the 10th Annual Computer Security Applications Conference, Orlando, FL. 10 pages, (found at http://seclab.cs.ucdavis.edu/papers.html), Dec. 1994.

"Arificial Intelligence and Intrusion Detection: Current and Future Directions", Jeremy Frank, Proc. of the 17th National Computer Security Conference, 12 pages, (found at http://seclab.cs.ucdavis.edu/papers.html), 1994.

"Automated Detection of Vulnerabilities in Privileged Programs by Execution Monitoring", Ko et al., Proc. of the 10th Annual Computer Security Applications Conference, Orlando, FL. (found at http://seclab.cs.ucdavis.edu/papers.html), 1994.

"Common Techniques in Fault–Tolerance and Security", Levitt et al., Proc. of the dependable Computing for Critical Applications 4, San Diego, CA. 4 pages, (found at http://seclab.cs.ucdavis.edu/papers.html), 1994.

"Network Intrustion Detection", Mukherjee et al., *IEEE Network,* May–Jun. 1994, vol. 8, No. 3, pp. 26–41. (found at http://seclab.cs.ucdavis.edu/papers.html), 1994.

"A New Suggestion for How to Encrypt with RSA", Bellare et al., Eurocrypt '94, 20 pages, (found at http://seclab.cs.ucdavis.edu/papers.html), 1994.

"The Security of Cipher Block Chaining", Ballare et al., Advances in Cryptology—CRYPTO '94, Santa Barbara CA. (19 pages.) (found at http://seclab.cs.ucdavis.edu/papers.html), 1994.

"Analysis Of An Algorithm For Distributed Recognition And Accountability", Ko et al., Proc. 1st ACM Conference on Computer Communication Security. Fairfax, VA, Nov. 1993, 11 pages. (found at http://seclab.cs.ucdavis.edu/papers.html), 1993.

"Entity Authentication and Key Distribution". Bellare et al., Advances in Cryptology—CRYPTO '93, Santa Barbara, CA, Aug. 1993, pp. 232–249. (found at http://seclab.cs.ucdavis.edu/papers.html), Aug. 1993.

"Random Oracles are Practical: A Paradigm for Designing Efficient Protocols", Bellare et al., Proc. of the 1st ACM Conference on Computer and Communication Security, Fairfax, VA, Nov. 1993, pp. 1545–164. (found at http://seclab.cs.ucdavis.edu/papers.html), 1993.

"A Software–Optimized Encryption Algorithm", Rogaway et al., Proc. of the Fast Software Encryption Cambridge Security Workshop, Cambridge, UK (16 pages.) (found at http://seclab.cs.ucdavis.edu/papers.html), 1993.

"Anatomy of a Proactive Password Changer", Matt Bishop, Proc. of the UNIX Security Symposium III Baltimore, MD, 15 pages. (found at http://seclab.cs.ucdavis.edu/papers.html), 1992.

DIDS (Distributed Intrusion Detection System)—Motivation, Architecture, and An Early Prototype, Snapp et al., Proc. 14th National Computer Security Conference, Washington, DC (9 pages.) (found at http://seclab.sc.ucdavis.edu/papers.html), 1991.

"Proactive Password Checking", Matt Bishop, Proc. of the 7th International Conference on Information Security, May 1991, pp 169–181. (found at http://seclab.cs.ucdavis.edu/papers.html), 1991.

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers.html), 1992.

Abstract entitled "Collaboration Using Roles" by M. Bishop, *Software—Practice and Experience,* vol. 20, No. 5, May 1990. (found at http://seclab.cs.ucdavis.edu/papers.html), May 1990.

Abstract entitled "An Extendable Password Checker" by M. Bishop, Proc. UNIX Security II Portland, OR, Aug. 27–28, 1990, pp. 15–16, (found at http://seclab.cs.ucdavis.edu/papers.html), 1990.

Abstract entitled "A Security Analysis of the NTP Protocol Version 2" by M. Bishop, Dec. 1990.

Abstract entitled "A Little Knowledge Goes a Long Way: Faster Detection of Compromised Date in 2–D Tables" by D. Gusfield, Proc. of the 1990 IEEE Symposium on Research in Security and Privacy, Oakland, CA, May 7–9, 1990, pp. 86–94, (found at http://seclab.cs.ucdavis.edu/papers.html), May 1990.

Abstract entitled "A Network Security Monitor" by L. T. Heberlein, G. V. Dias, K.N. Levitt, B. Mukherjee, and others Proc. of the 1990 IEE Symposium on Research in Security and Privacy, Oakland, CA, May 7–9, 1990, pp. 296–304, (found at http://seclab.cs.ucdavis.edu/papers.html), May 1990.

Abstract entitled "Static Analysis Virus Detection Tools UNIX Systems" by P. Kerchen, et al., Proc. 13th National Computer Security Conference, Washington, DC, Oct. 1–4, 1990, pp. 350–365, (found at http://seclab.cs.ucdavis.edu/papers.html), Oct. 1990.

Abstract entitled "Security with Low Communication Overhead" by D. Beaver, et al., Proc. Advances in Cryptology—CRYPTO '90, Santa Barbara, CA, Aug. 11–15, 1990, pp. 62–76, (found at http://seclab.cs.ucdavis.edu/papers.html), Aug. 1990.

Abstract entitled "The Round Complexity of Secure Protocols" by D. Beaver, et al., Proc. of the 22nd Annual ACM Symposium on Theory of Computing, Baltimore, MD, May 14–16, 1990, pp. 503–513. (found at http://seclab.cs.ucdavis.edu/papers.html), May 1990.

Abstract entitled "PACLs: An Access Control List Approach to Anti–Viral Security" by D. R. Wichers, et al., Proc. 13th National Computer Security Conference, Washington, DC, Oct. 1–4, 1990, pp. 340–349, (found at http://seclab.cs.ucdavis.edu/papers.html), Oct. 1990.

Abstract entitled "Verification of Secure Distributed Systems in Higher Order Logic: A Modular Approach Using Generic Components" by J. Alves–Foss, K. Levitt, Proc. of the 1991 IEEE Computer Society Symposium on Research in Security and Privacy, Oakland, CA May 20–22, 1991, pp. 122–135. (found at http://seclab.cs.ucdavis.edu/papers.html), May 1991.

Abstract entitled "An Authentication Mechanism for USENET" by M. Bishop, Proc. of the Winter 1991 USENIX Conference. Jan. 21–25, 1991, pp. 281–287, (found at http://seclab.cs.ucdavis.edu/papers.html), Jan. 1991.

Abstract entitled "Password Management" by M. Bishop, COMPCON Spring '91. Digest of Papers. San Francisco, CA, Feb. 25–Mar. 1, 1991, pp. 167–169. (found at http://seclab.cs.ucdavis.edu/papers.html), Mar. 1991.

Abstract entitled "Teaching Computer Security" by M. Bishop, May 1993.

Abstract entitled "Recent Changes to Privacy Enhanced Electronic Mail" by M. Bishop, *Journal of Internetworking: Research and Experience.* vol. 4, No. 1, Mar. 1993, pp. 47–59. (found at http://seclab.cs.ucdavis.edu/papers.html), Mar. 1993.

Abstract entitled "A Modified Perturbation Method for Database Security" by P. Tendick, N. Matloff, *ACM Transactions on Database Systems,* Mar. 1994, vol. 19, No. 1, pp. 47–63, (found at http://seclab.cs.ucdavis.edu/papers.html), Mar. 1994.

Short Presentation entitled "Intrusion Detection for network Infrastructures" by S. Cheung, K.N. Levitt, C. Ko. The 1995 IEEE Symposium on Security and Privacy, Oakland, CA, May 1995.

Master Thesis entitled "Paradaigms for the Reduction of Audit Trails" by B. Wetmore, pp. i–6. Unable to obtain entire thesis—portion downloaded from http://seclab.cs.ucdavis.edu/papers.html, 1993.

"Open System Security—an Architectural Framework" by Arto T. Karila, (found at http://www/cs.purdue.edu/coast/archive/data/categ.30.html), Jun. 1991.

Product description for "Oil Change" located on the Internet at http://store.mcafee.com/product.asp?ProductID=28&CategoryID–12, pp. 1–2, no date.

NetRanger 1.3 User's Guide, Copyright © 1997 by Wheel-Group Corporation, NetRanger product first available summer of 1996, 1996.

"Information Security and Privacy in Network Environments," by U. S. Office of Technology Assessment, OTA–TCT–606 (Washington DC: US Government Printing Office), Sep. 1994.

"A Few Attacks on the Zero Knowledge State in Novell's Netware" by Greg Miller, pp. 1–11. (found at http://www.cs.purdue.edu/coast/archive/data/categ30.html), Jul. 30, 1996.

* cited by examiner

SYSTEM AND METHOD FOR REAL-TIME INSERTION OF DATA INTO A MULTI-DIMENSIONAL DATABASE FOR NETWORK INTRUSION DETECTION AND VULNERABILITY ASSESSMENT

TECHNICAL FIELD OF THE INVENTION

This invention relates in general to the field of computer network environments and, more particularly, to a system and method for real-time insertion of data into a multi-dimensional database for network intrusion detection and vulnerability assessment.

BACKGROUND OF THE INVENTION

Managing networks can largely be a matter of risk management and decision support. Network administrators want to minimize the risk of events such as equipment failure while, at the same time, maximize performance such as high bandwidth. These types of management tasks bring with them a number of types of data management problems. For example, for failures in the network, the types of questions that an administrator needs to ask depend upon the current context: such as how, where and when did the event occur. Further, the desired context may change during the course of an inquiry. For example, the question that ultimately leads to an answer to a network problem may be quite different than the one with which the administrator began.

Assuming that detailed information about a network is available, effective navigation through such large amounts of information generally requires hierarchical summarization. For example, the schema for locating an event might be represented using the following: region, city, network, segment, device, operating system and version. Further, the level of detail needed can change during the course of an inquiry. For example, in order to solve a particular problem in the southwest region of a network, the network administrator may need to identify the particular version of the operating system on a specific device in that region of the network. Other problems may not need that level of granularity.

Further, not only do network administrators worry about operational problems with the network, they should also manage the detection of and response to unauthorized intrusions into the network. Such intrusion events need to be addressed to prevent or limit any exposure of critical data. To help in this task, there are a number of conventional intrusion detection systems available that can monitor the network and detect intrusion events. Some of these system can also automatically respond to certain types of intrusion. The NETRANGER product, available from CISCO SYSTEMS, INC., is one example of such an intrusion detection system. Further, there are products that allow an administrator to assess, in general, what vulnerabilities exist in the network. The NETSONAR product, available from CISCO SYSTEMS, INC., is one example of such a network vulnerability assessment system.

Although conventional security systems can ease the task of network administration, it is desirable to provide a system that allows both robust viewing of network configuration and vulnerability details as well as ongoing detection of and response to unauthorized intrusions into the network.

SUMMARY OF THE INVENTION

In accordance with the present invention, a system and method for real-time insertion of data into a multi-dimensional database for network intrusion detection and vulnerability assessment are disclosed that provide significant advantages over conventional network security tools.

According to one aspect of the present invention, the system includes a multi-dimensional database and a user interface operable to access and provide views into the multi-dimensional database. A data insertion engine is coupled to and operable to access the multi-dimensional database. The data insertion engine is further operable to receive a real-time data feed, to process the real-time data feed and to insert data into the multi-dimensional database responsive to processing of the real-time data feed. In one embodiment, the real-time data feed can represent exploited network vulnerabilities, and the system can be used for network intrusion detection and vulnerability assessment.

According to another aspect of the present invention, the method includes receiving a real-time data feed representing detection of an event and processing the event against the multi-dimensional database. Cells associated with the event are identified in the multi-dimensional database and appropriate vectors to the identified cells are created. Data representing the event is then inserted at the identified cells. Visibility to the inserted data is provided through a user interface to the multi-dimensional database. In one embodiment, the event can be an exploited network vulnerability, and the method can be used for intrusion detection and vulnerability assessment.

It is a technical advantage of the present invention that real-time data feeds representing intrusion detection events are processed to generate data that is inserted real-time into a multi-dimensional database. A network administrator can then interface with the multi-dimensional database to obtain real-time visibility of intrusion events and any correlation to known aspects of the network environment.

It is another technical advantage that a robust real-time vulnerability assessment and intrusion detection tool can be provided that allows intrusion detection events to be associated with specific network resources having known confirmed or potential vulnerabilities.

Other technical advantages of the present invention should be apparent to one of ordinary skill in the art in view of the specification, drawings and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIGS. 3A, 3B, 3C and 3D are diagrams of one embodiment of vectors from dimensions to cells and intersections within a multi-dimensional database;

DETAILED DESCRIPTION OF THE INVENTION

Figure 1:
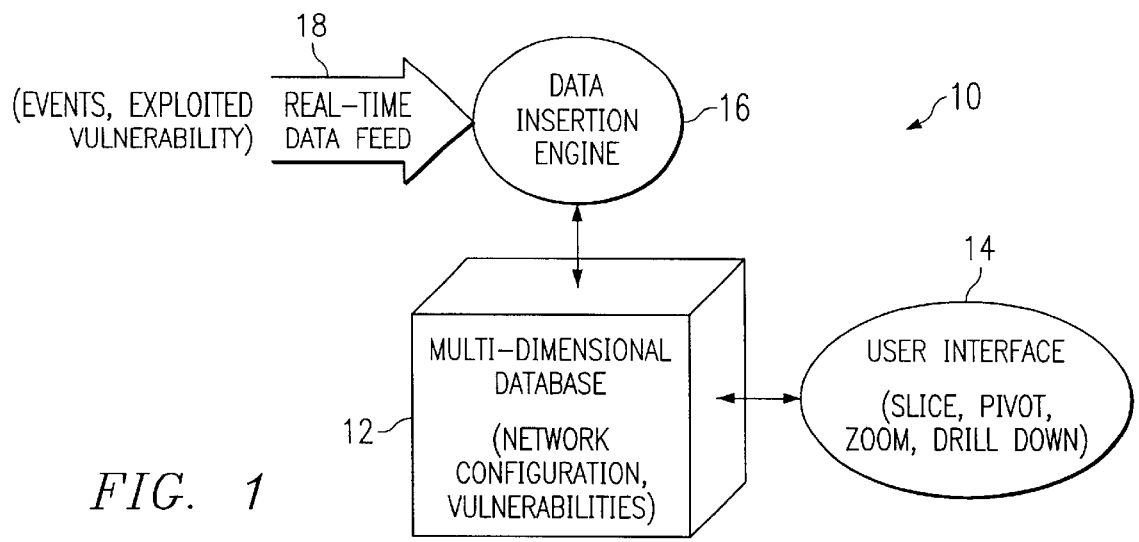
FIG. 1 is a block diagram of a system for real-time insertion of data into a multi-dimensional database.

FIG. 1 is a block diagram of a system, indicated generally at 10, for real-time insertion of data into a multi-dimensional database. System 10 can be implemented using computer systems having typical computer components such as a processor, memory, storage devices, etc. In the embodiment of FIG. 1, system 10 includes a multi-dimensional database 12 that can be accessed by and viewed from a user interface 14. User interface 14 can allow a user to view data stored in cells within multi-dimensional database 12. In system 10 of FIG. 1, a data insertion engine 16 is coupled to and interfaces with multi-dimensional database 12. Data insertion engine 16 can receive and process a real-time data feed 18 and insert associated data into multi-dimensional database 12. Multi-dimensional database 12 can be characterized as having a number of hierarchical dimensions which can be defined by self-describing schema associated with database 12. The hierarchical dimensions provide a structure by which the data is organized and can be visualized as a series of honeycombs nested within one another. Some general aspects of conventional multi-dimensional databases, for example, are disclosed and described in U.S. Pat. Nos. 5,647,058; 5,319,777; 5,592,666 and 5,721,910.

As an extension upon conventional uses for multi-dimensional databases, it has been determined that one of the more effective ways to deal with a network administrator's requirements is to store network information in a multi-dimensional database that fully represents the managed network environment. The multi-dimensional database can then support flexible query techniques against the stored data such as slices, pivoting, zooming and drill down. The manner in which the database cells are aggregated and nested can be dictated by hierarchical rules defined for each of the database's dimensions. For example, network events could be stored in a simple multi-dimensional database based on three basic indices: time, address space, and event type. Every cell within the honeycomb, regardless of its level within hierarchies, also can contain some type of scalar data (e.g., counts, averages, min/max values, etc.) These types of constructs make it possible to view information relative to points of intersection across one or more of the database dimensions. For example, a hypothetical query might be to "show the number of hosts (scaler value) that have been accessed since Friday (time) via a telnet session (event type) from outside the network (address space)."

One problem with multi-dimensional databases as applied to the problem of providing visibility into network data is that such databases do not support real-time data feeds. Real-time data feeds, however, are needed for intrusion detection systems that allow an administrator to react to real-time events. The lack of support for a real-time data feed is, in part, due to a reliance on sparsely populated, highly indexed and denormalized data storage. In contrast, multi-dimensional database 12 results from a strategy for maintaining real-time data feeds into the cells at every level of multi-dimensional database 12 based upon a vectored arrayed database construct.

In the embodiment of FIG. 1, data insertion engine 16 operates to receive real-time data feed 18 which provides information to be inserted into multi-dimensional database 12. This information can, for example, represent real world events such as detected network intrusion events. Data insertion engine 16 processes real-time data feed 18 with built-in intelligence about the structure of multi-dimensional database 12. Data insertion engine 16 then identifies data to be inserted into multi-dimensional database 12 as well as cells to receive the inserted data. Data insertion engine 16 also creates vectors from the dimensions of multi-dimensional database 12 into those cells. Data insertion engine 16 then inserts data into multi-dimensional database 12 based upon this processing of real-time data feed 18. Once the data is inserted, user interface 14 provides visibility to that real-time data as other data stored within multi-dimensional database 12.

In one implementation, multi-dimensional database 12 can be used to store and provide views into network environment information needed by a network administrator. In this implementation, multi-dimensional database 12 can store data representing the results of a network vulnerability assessment of the network. For example, generating network vulnerability assessment data and storing it in a multidimensional database are disclosed and described in U.S. patent application Ser. No. 09/107,964, entitled "System and Method for Rules-driven Multi-phase Network Vulnerability Assessment", the disclosure of which is incorporated herein by reference. Further in this implementation, real-time data feed 18 can provide information about network intrusion events identified, for example, by an intrusion detection system such as the NETRANGER product available from CISCO SYSTEMS, INC. Data insertion engine 16 can process this real-time data feed 18 to associate the intrusion events with cells in multi-dimensional database 12 that are appropriate for representing the occurrence of the intrusion events. For example, data insertion engine 16 can associate an intrusion event with the host machine and service against which the attack was directed. Then, data insertion engine 16 can create appropriate vectors to those cells and insert data at those cells to record the occurrence of the intrusion event. This intrusion data then augments the vulnerability data already stored within multi-dimensional database 12. Subsequently, user interface 14 can operate, passively and actively, to provide visibility and response to this inserted data. For example, user interface 14 can passively allow a user to view what intrusion events have occurred. Actively, user interface 14 could monitor certain cells and categories of data and react to insertions by notifying a network administrator (e.g., by e-mail, pager, call, alarm, etc.). Once created, multi-dimensional database 12 can present, for example, this vulnerability assessment and intrusion detection information through a variety of different user interfaces, including a browser-type interface, that provide significant freedom in how the data is viewed.

Figure 2:
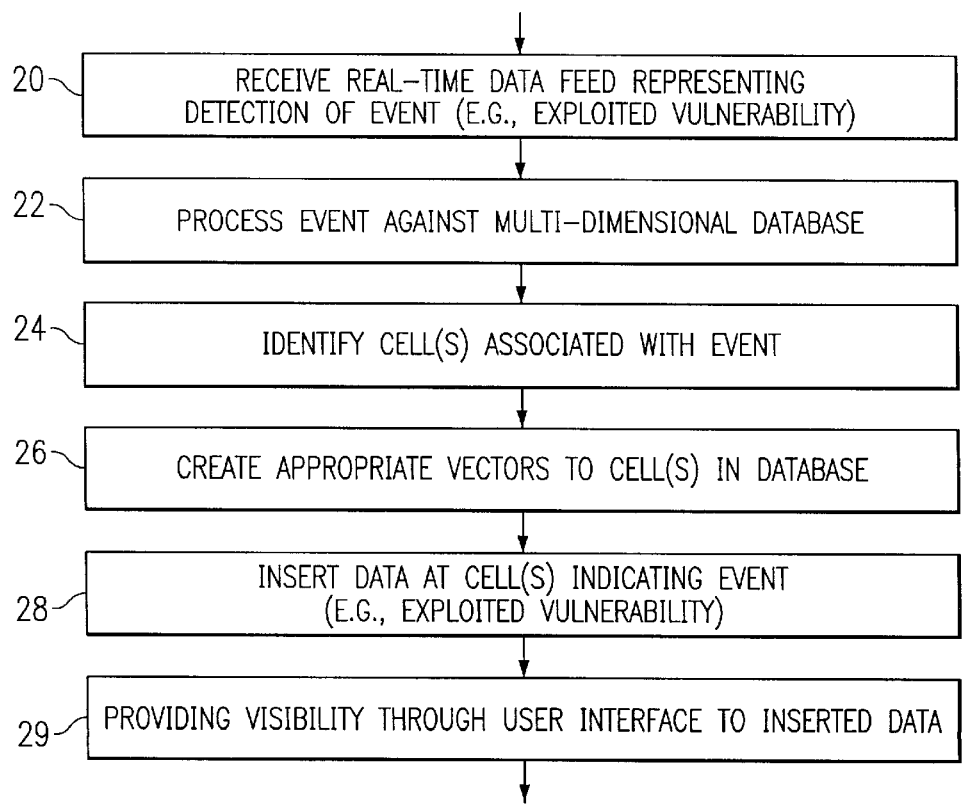
FIG. 2 is a flow chart of one embodiment of a method for real-time insertion of data into a multi-dimensional database.

FIG. 2 is a flow chart of one embodiment of a method for real-time insertion of data into a multi-dimensional database. As shown, in step 20, a data insertion engine can receive a real-time data feed representing the detection of an event, for example, the exploitation of a vulnerability within a network. Then, in step 22, the data insertion engine can process the event against a multi-dimensional database. For example, the multi-dimensional database can store data representing the network environment, including known vulnerabilities of the network. In step 24, the data insertion engine can identify cells in the database that are associated with the real-time event. For example, the insertion engine could identify cells that are linked to the host machine, service and confirmed vulnerability that was exploited. In step 26, the data insertion engine creates appropriate vectors to the identified cells. Then, in step 28, the data insertion engine inserts data at those cells indicating the exploited vulnerability. In step 29, visibility to the real-time event is provided through the user interface. For example, a user could be allowed to view data within the multi-dimensional database that includes information about an exploited vulnerability. In addition, as mentioned above, the user interface could actively react to the insertion of data, for example, by alerting a network administrator that a particular exploited vulnerability event had occurred.

FIGS. 3A, 3B, 3C and 3D are diagrams of one embodiment of vectors from dimensions to cells and intersections within a multi-dimensional database, indicated generally at 30. In the embodiment of FIG. 3, the database has seven dimensions 32 each having a hierarchical structure. In particular, dimensions 32 representing categories of information about a network environment and include: host address, ports, services, operating system, vulnerability (potential), vulnerability (confirmed) and vulnerability (exploited). As shown, dimension nodes 33 of dimensions 32 are linked by vectors 35 to cells 34, each of which can store some type of scalar data. As should be understood, database 30 comprises large numbers of cells 34 which are linked to dimensions 32. In the example of FIG. 3, cells 34 can be considered logically grouped in that they have vectors linking them to the same host address on host dimension 32. Also, each cell 34 has vectors linking it to different ports and services but the same operating system. Further, a potential vulnerability exists with respect to one cell 34, while a confirmed vulnerability exists with respect to the other cell 34. In other words, the host address/operating system/port/service of one cell 34 has a confirmed vulnerability, while the host address/operating system/port/service of the other cell 34 has a potential vulnerability. Further, one of cells 34 is linked to an exploited vulnerability showing that one or more intrusion events were detected that involved the exploitation of a linked confirmed vulnerability on the linked host address/operating system/port/service.

The hierarchical structure of each dimension 32 can be defined as appropriate for the particular application. In general, each dimension hierarchy begins at a generic level and ends at a specific level with respect to that dimension. For example, the following tables provide example hierarchies for the host address and operating systems dimensions 32 shown in FIG. 3.

TABLE 1

| Host address | | | | | | | | | | | |
|---|---|---|---|---|---|---|---|---|---|---|---|
| 172 | | | | | | 223 | | | | | |
| 19 | | 21 | | | | 67 | | | | | |
| 2 | 15 | 45 | 30 | 31 | 34 | 15 | 23 | 27 | 58 | 91 | |

TABLE 2

| OPERATING SYSTEM | | | | | |
|---|---|---|---|---|---|
| router | printer | workstation | | | unknown |
| proprietary | other | unix | | | ms |
| cisco ios | stk bos | lexmark * | hp hpux | ibm aix | sun solaris | windows nt |

The database entity relationships within database 30 of FIG. 3 can be summarized as follows. Hierarchies of dimensions 32 are classic B-Trees where: a child node has only one parent (1-1), and a parent can have one or more children (1-N). A dimension node 33 can map to one or more database cells 34 (1-N) via one or more vectors 35. Also, a database cell 34 can map to one or more dimension nodes 33 (N-1) via one or more vectors 35.

Due to the vectored structure, database 30 can easily be navigated from any particular dimension or set of dimensions to other dimensions or set of dimensions. This supports the implementation of a flexible and robust user interface to provide views into database 30. For example, a view of a host address with a particular operating system can easily be switched to a view of that host address with a particular confirmed vulnerability by simply following one link out from cell 34 to the confirmed vulnerability dimension 32. The vectors 35 linking dimensions 32 to cells 34 can be accomplished using a link list vectored array data structure. Note that leaf nodes 33 of each dimension hierarchy link to a physical point of intersection or cell 34. Higher order nodes 33 in a dimension hierarchy may map to aggregations of cells 34. Within this structure, each cell of a grid interface view (or slice view) of database 30 can represent a point of intersection between dimension nodes 33.

Figure 3B:
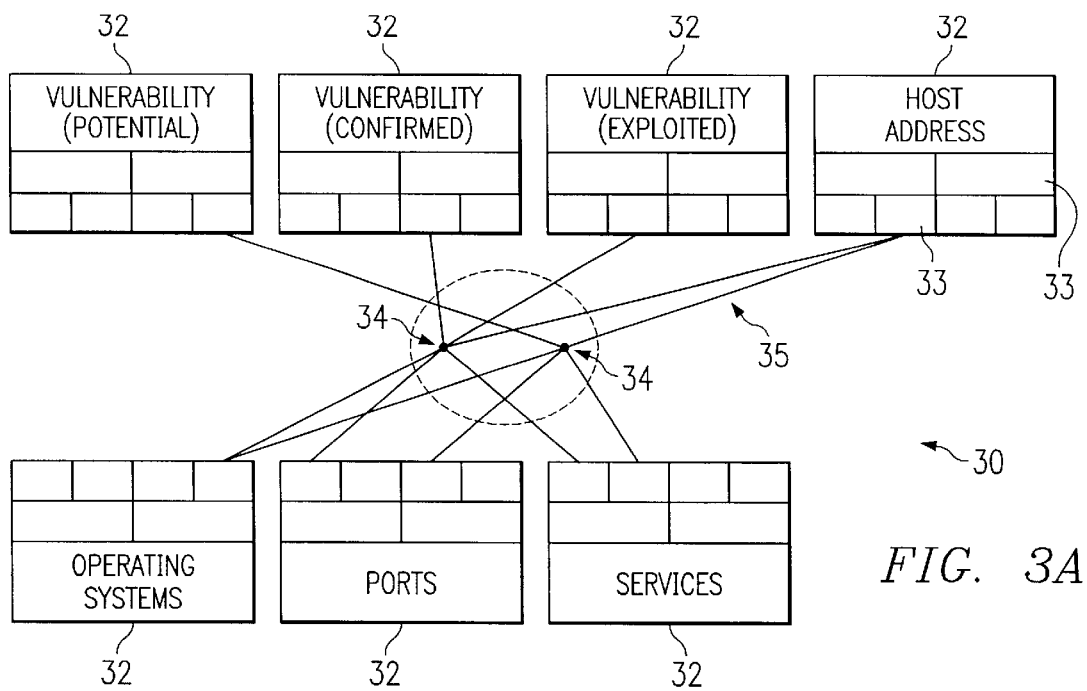
Figure 3B:
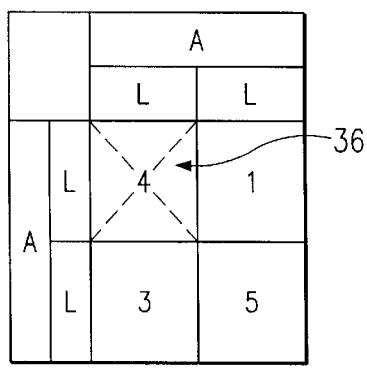
Figure 3C:
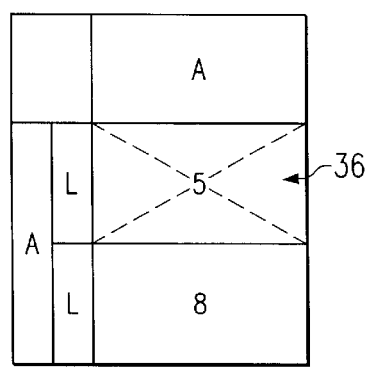
Figure 3D:
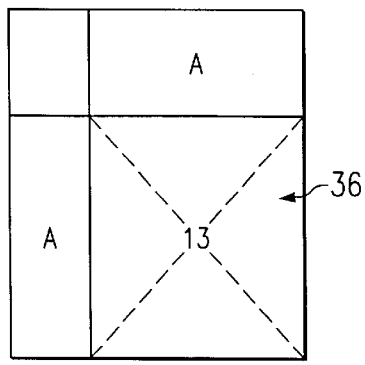

FIGS. 3A, 3B and 3C show embodiments of three types of intersection. FIG. 3A shows a leaf node to leaf node (L-L) intersection. FIG. 3B shows a leaf node to aggregate node (L-A) intersection, and FIG. 3C shows an aggregate to aggregate (A-A) intersection. As shown, the grid views display scalar values 36 at the points of intersection. Calculation of a scalar value 36 for any given point of intersection (L-L, L-A, or A-A) is effectively a two step process that relies on the ability to map a node 33 to its corresponding database cell(s) 34 and then to identify the vector(s) 35 to the opposing dimension 32. Once these linkages are established, it is possible to calculate the associated scalar value(s) 36. For example, FIG. 3B shows scalar values at four leaf node to leaf node intersections. Then, FIG. 3C shows a scalar values 36 for two leaf node to aggregate node intersections where two of the leaf nodes of FIG. 3B have been aggregated. Further, FIG. 3D shows a scalar value 36 for an aggregate node to aggregate node intersection where the remaining two leaf nodes of FIG. 3C have been aggregated.

Figure 4:
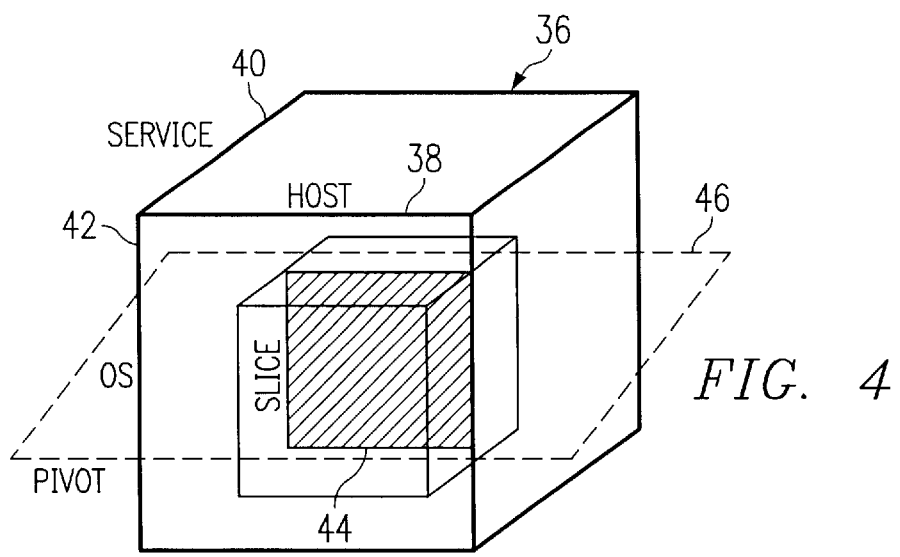
FIG. 4 is a diagram of one embodiment of views into a multi-dimensional database.

FIG. 4 is a diagram of one embodiment of views into a multi-dimensional database. As shown, a multi-dimensional database 36 could have among its dimensions the following three dimensions: a host address dimension 38, a service dimension 40 and an operating system dimension 42. One way to view data within database 36 is via a two-dimensional slice 44 of database 36. Slice 44 can thus provide a grid view of data based upon the point or set of intersection of two selected dimensions at selected levels within the hierarchy of the selected dimensions. Another view of database 36 can then be obtained via a pivot 46. Pivot 46 is a shift from viewing slice 44 by changing one of the dimensions being viewed.

Figure 5A:
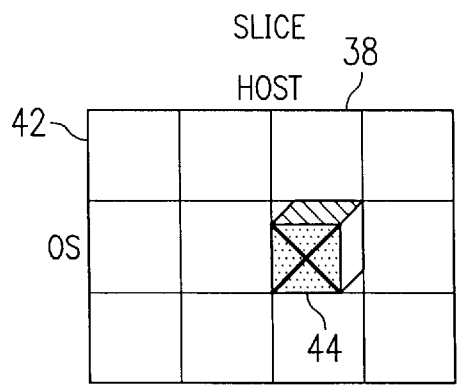
FIG. 5A is a diagram of one embodiment of a slice view into the multi-dimensional database of FIG. 4.

FIG. 5A is a diagram of one embodiment of a slice view into the multi-dimensional database of FIG. 4. As shown, slice 44 can provide a view based upon selecting operating system dimension 42 and host address dimension 38. Thus, slice 44 could show which host addresses have which operating systems at various levels of granularity. FIG. 5A, however, does not detail at what level within the hierarchies of each dimension is being viewed. A viewing aspect called zooming, which is described with respect to FIGS. 6A and 6B, allows a user to move up and down within the levels of the dimension hierarchy of slice 44.

Figure 5B:
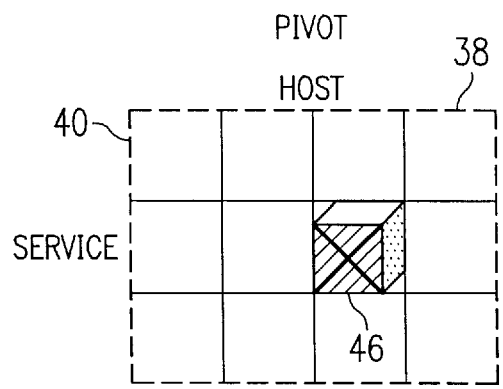
FIG. 5B is a diagram of one embodiment of a pivot view from the slice view of FIG. 5A.

FIG. 5B is a diagram of one embodiment of a pivot view from the slice view of FIG. 5A. As shown, pivot 46 involves changing one of the dimensions being viewed. In this example, operating system dimension 42 is replaced with service dimension 40. Thus, the view into database 36 has been pivoted at the same hierarchical level of host address dimension 38 to show its intersection with service dimension 40. This new view then shows, for example, which services are available on which host adresses.

Figure 6A:
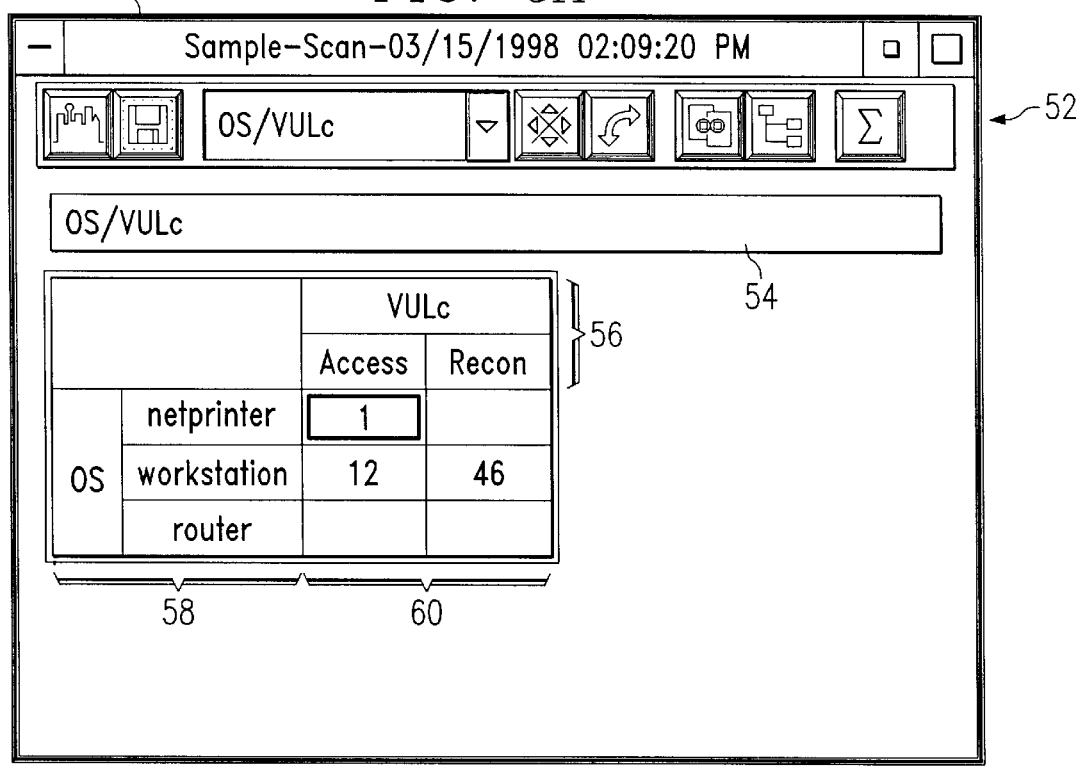
FIGS. 6A and 6B are diagrams of one embodiment of zooming views into a multi-dimensional database.
Figure 6B:
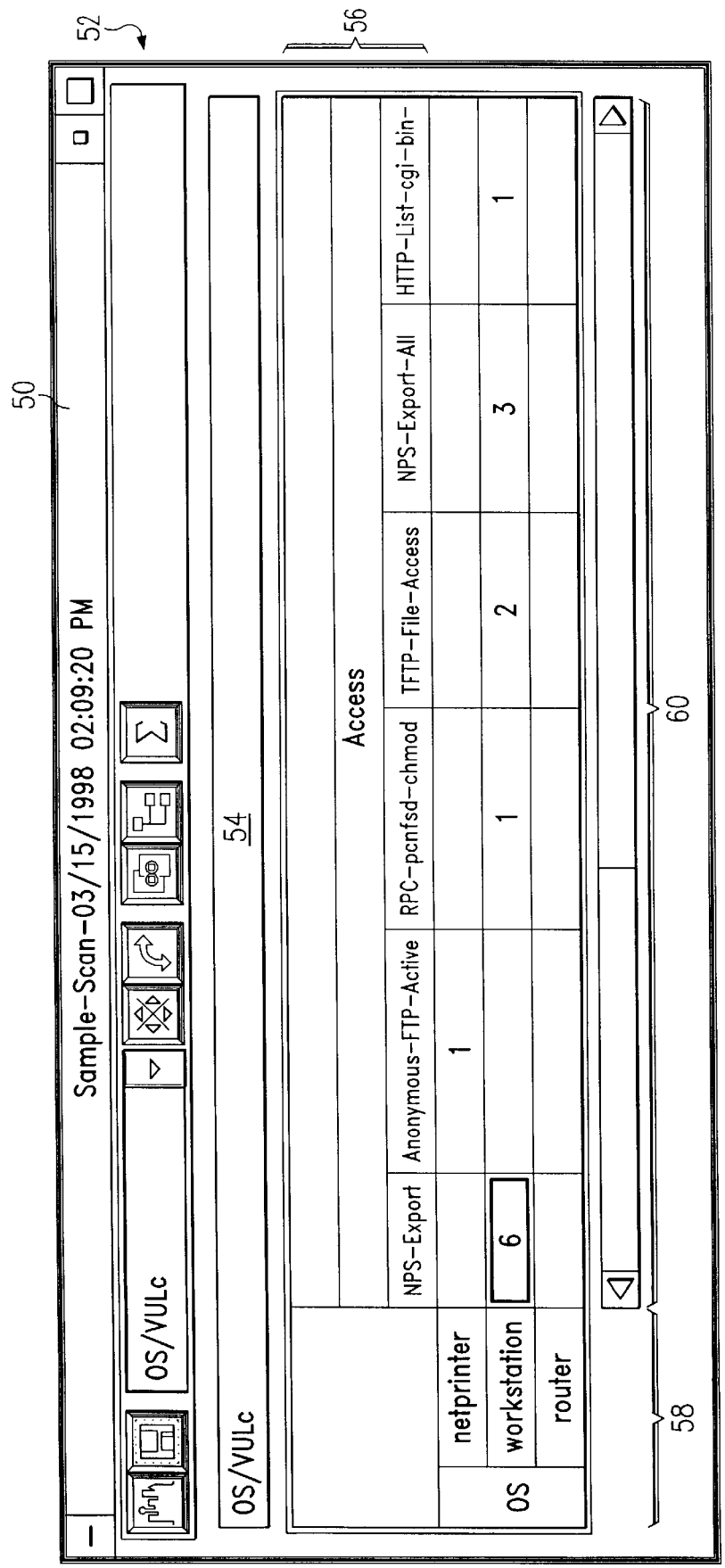

FIGS. 6A and 6B are diagrams of one embodiment of zooming views into a multi-dimensional database. As shown, a window 50 can include controls 52 and a banner 54 which indicates the current dimensions being viewed. In the example of FIG. 6A, the current view is a slice with dimensions of confirmed vulnerabilities 56 and operating system 58. Further, both dimensions are viewed with two layers of the hierarchy exposed. For example, operating system dimension 58 shows one level down to: network printers, workstations and routers. Confirmed vulnerability dimension 56 shows one level down to: access and reconnaissance vulnerabilities. Further, the slice view of FIG. 6A provides scalar data 60 at the intersection of dimensions 56 and 58. In the example shown, there are 12 confirmed access vulnerabilities and 46 confirmed reconnaissance vulnerabilities on workstations. Also, there is one confirmed access vulnerability on a network printer. The vulnerabilities are distributed across these network devices. To understand how these vulnerabilities occur by host address, the information could be viewed by that dimension or a drill down view could be used.

FIG. 6B is a diagram of one embodiment of zooming from the slice view of FIG. 6A to the slice view of FIG. 6B. As shown, the view is still provided within a window 50 that has controls 52 and a banner 54. Also, dimensions 56 and 58 have not changed except for the level within the hierarchy of the confirmed vulnerability dimension 56. In this dimension 56, another level within the hierarchy has been uncovered which includes the shown types of access vulnerabilities. Further, the scalar data 60 has been expanded to show, for example, that the twelve workstation access vulnerabilities fall into the indicated five types. Thus, the zooming function allows a user to change the granularity with which the data is viewed by moving up and down within the hierarchy of the particular dimensions.

Figure 7C:
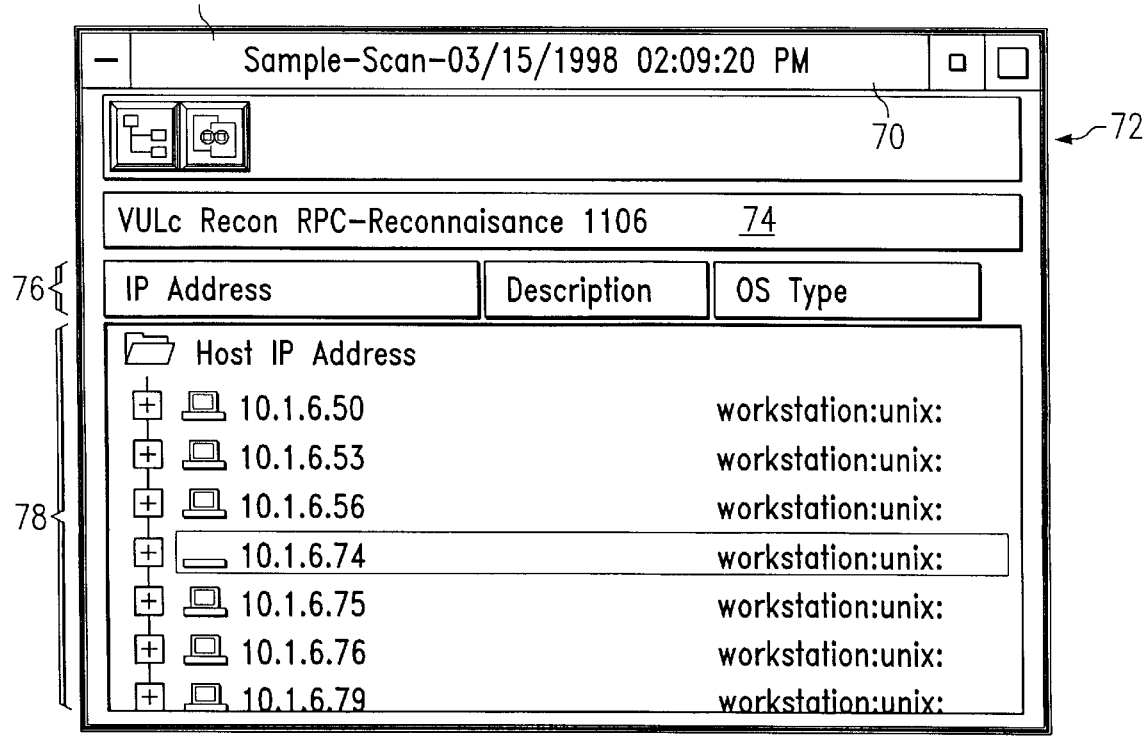
FIGS. 7A, 7B and 7C are diagrams of one embodiment of drill down views into a multi-dimensional database.
Figure 7A:
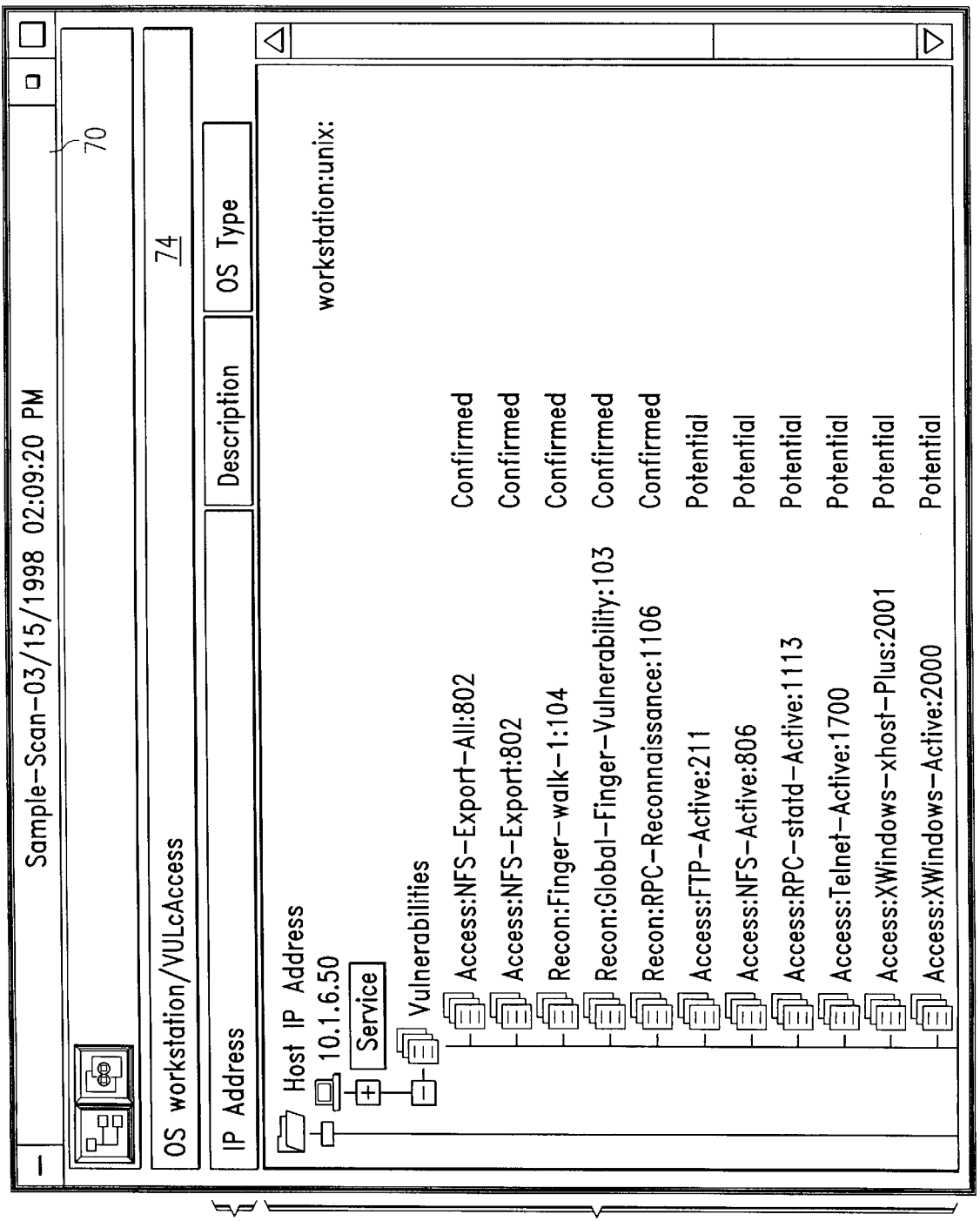
Figure 7B:
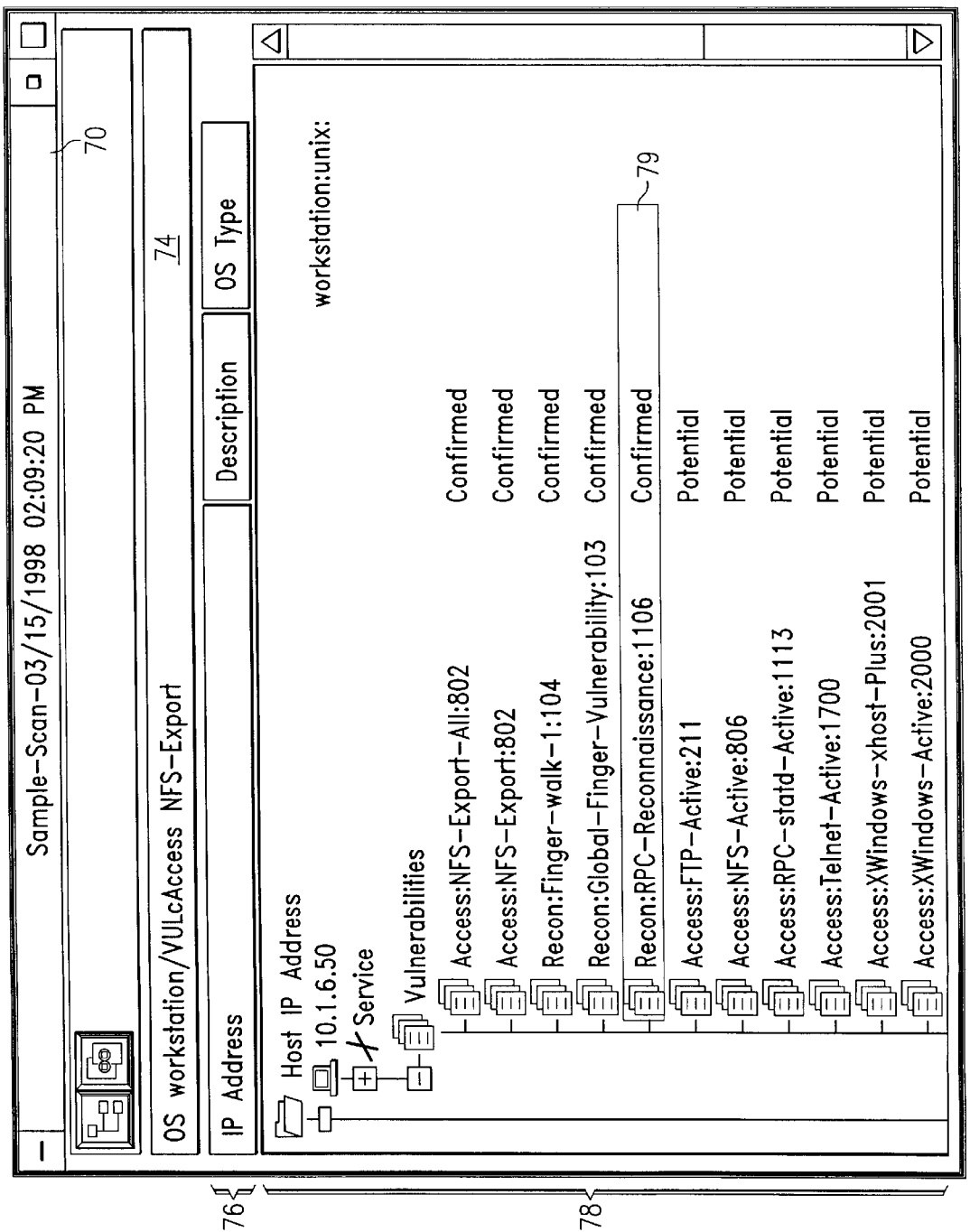

FIGS. 7A, 7B and 7C are diagrams of one embodiment of drill down views into a multi-dimensional database. As shown in FIG. 7A, a window 70 can include controls 72 and a banner 74. Banner 74 provides an indication of dimensions of the database being viewed. For example, the information being viewed is a list of host IP addresses for workstations that have confirmed vulnerabilities of the type "access". Referring back to FIG. 6A, there might be twelve instances of confirmed access vulnerabilities on workstations. The drill down view of FIG. 7A involves displaying detailed physical information about the characteristics of the host machines where those vulnerabilities occur. Thus, column headings 76 and physical information 78 provide data about the specific network devices that are summarized by the scalar data of FIG. 6A. In this manner, users can incrementally drill down from summary information to physical information to gain specific information about a particular entry.

FIG. 7B shows that a user has selected the "Recon:RPC Reconnaissance:1106" vulnerability underneath the host system with an IP address of "10.1.6.50." FIG. 7C then shows the user obtaining a full list of host IP addresses that share the "Recon:RPC Reconnaissance:1106" vulnerability. Thus, the user can pivot from viewing the list of hosts sharing confirmed vulnerabilities of type "access" to viewing a list of hosts sharing a confirmed vulnerability of "Recon:RPC Reconnaissance:1106".

A user can thus switch between slice, pivot, zooming and drill down views of data in the multi-dimensional database to view needed network information. The slice view generally displays points or sets of intersection of varying size, and the zoom view allows changes of the level and size of the sets (e.g., higher within the hierarchy equates to a larger set and vice versa). The pivot view allows a different set of intersection to be viewed, and the drill down view allows identification of those hosts that make up the set at a particular intersection. Together, this provides a robust interface into the data held within the multi-dimensional database that can be particularly advantageous for a network administrator trying to trouble shoot issue with the manage network.

Thus, the user interface can provide a grid browser type view into the data that displays data at different levels of granularity and from different perspectives. The multi-dimensional database and user interface integrated with the ability to process real-time data feeds and insert real-time data into the multi-dimensional database provide significant advantages. The multi-dimensional database can capture a complex yet navigable view of the network configuration as well as assessed vulnerabilities. The real-time data feed can provide important data as to the existence of intrusion events. The integration of these features can provide a robust real-time vulnerability assessment and intrusion detection tool allowing intrusion detection events to be associated with specific network resources having known confirmed or potential vulnerabilities.

Although the present invention has been described in detail, it should be understood that various changes, substitutions and alterations can be made thereto without departing from the spirit and scope of the invention as defined by the appended claims.

What is claimed is:

1. A system for real-time insertion of data into a multi-dimensional database, comprising:
   a multi-dimensional database;
   a user interface operable to access and provide views into the multi-dimensional database, wherein the views comprise any of a slice, a pivot or a zoom view; and
   a data insertion engine coupled to and operable to access the multi-dimensional database;
   the data insertion engine further operable to receive a real-time data feed provided by a network intrusion detection system, to process the real-time data feed and to insert data into the multi-dimensional database responsive to processing of the real-time data feed.

2. The system of claim 1, wherein the real-time data feed represents detection of an event.

3. The system of claim 2, wherein the multi-dimensional database stores data representing a configuration of a network environment.

4. The system of claim 3, wherein the configuration of the network environment includes network vulnerability information.

5. The system of claim 4, wherein the event is an exploited vulnerability within the network environment.

6. The system of claim 5, wherein the user interface is further operable to actively alert a system administrator responsive to the exploited vulnerability.

7. The system of claim 5, wherein dimensions of the multi-dimensional database comprise host address, operating system, ports, and services.

8. The system of claim 7, wherein the dimensions further comprise confirmed vulnerabilities, potential vulnerabilities and exploited vulnerabilities.

9. The system of claim 1, wherein the user interface is further operable to provide views that comprise drill down views.

10. A method for real-time insertion of data into a multi-dimensional database, comprising:
    receiving a real-time data feed representing detection of an event, the real-time data feed being provided by a network intrusion detection system;
    processing the event against the multi-dimensional database;
    identifying cells in the multi-dimensional database that are associated with the event;
    creating appropriate vectors to the identified cells;
    inserting data representing the event at the identified cells; and
    providing visibility to the inserted data through a user interface, wherein providing visibility includes providing views that comprise any of a slice, a pivot or a zoom view.

11. The method of claim 10, wherein the multi-dimensional database stores data representing a configuration of a network environment.

12. The method of claim 11, wherein the configuration of the network environment includes network vulnerability information.

13. The method of claim 12, wherein the event is an exploited vulnerability within the network environment.

14. The method of claim 13, further comprising actively alerting a system administrator responsive to the exploited vulnerability.

15. The method of claim 14, wherein dimensions of the multi-dimensional database comprise host address, operating system, ports, and services.

16. The method of claim 15, wherein the dimensions further comprise confirmed vulnerabilities, potential vulnerabilities and exploited vulnerabilities.

17. The method of claim 10, wherein the views further comprise drill down views.

18. A system for real-time insertion of data into a multi-dimensional database, comprising:
    a storage device;
    an application stored on the storage device, the application operable to:
        receive a real-time data feed representing detection of an event, the real-time data feed being provided by a network intrusion detection system;
        process the event against the multi-dimensional database;
        identify cells in the multi-dimensional database that are associated with the event;
        create appropriate vectors to the identified cells;
        insert data representing the event at the identified cells; and
        provide visibility to the inserted data through a user interface, wherein providing visibility includes providing views that comprise any of a slice, a pivot or a zoom view.

19. The system of claim 18, wherein the event is an exploited vulnerability within the network environment.

20. The system of claim 18, wherein dimensions of the multi-dimensional database comprise host address, operating system, ports, and services.

21. The system of claim 20, wherein the dimensions further comprise confirmed vulnerabilities, potential vulnerabilities and exploited vulnerabilities.

22. A system for real-time insertion of data into a multi-dimensional database, comprising:
    means for receiving a real-time data feed representing detection of an event, the real-time data feed being provided by a network intrusion detection system;
    means for processing the event against the multi-dimensional database;
    means for identifying cells in the multi-dimensional database that are associated with the event;
    means for creating appropriate vectors to the identified cells;
    means for inserting data representing the event at the identified cells; and
    means for providing visibility to the inserted data through a user interface, wherein providing visibility includes providing views that comprise any of a slice, a pivot or a zoom view.

23. The system of claim 22, wherein the event is an exploited vulnerability within the network environment.

24. The system of claim 22, wherein dimensions of the multi-dimensional database comprise host address, operating system, ports, and services.

25. The system of claim 24, wherein the dimensions further comprise confirmed vulnerabilities, potential vulnerabilities and exploited vulnerabilities.

* * * * *